United States Patent
Sasage

(10) Patent No.: US 11,493,368 B2
(45) Date of Patent: Nov. 8, 2022

(54) INSTRUMENT PANEL INCLUDING LIQUID CRYSTAL DISPLAY DEVICE

(71) Applicant: NIPPON SEIKI CO., LTD., Niigata (JP)

(72) Inventor: Takuya Sasage, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 453 days.

(21) Appl. No.: 16/631,124

(22) PCT Filed: Jul. 26, 2018

(86) PCT No.: PCT/JP2018/028040
§ 371 (c)(1),
(2) Date: Jan. 14, 2020

(87) PCT Pub. No.: WO2019/022183
PCT Pub. Date: Jan. 31, 2019

(65) Prior Publication Data
US 2020/0132517 A1     Apr. 30, 2020

(30) Foreign Application Priority Data

Jul. 27, 2017 (JP) .............................. JP2017-145050

(51) Int. Cl.
*G01D 11/24*     (2006.01)
*G01D 11/28*     (2006.01)
*G01D 13/02*     (2006.01)

(52) U.S. Cl.
CPC ............. *G01D 11/24* (2013.01); *G01D 11/28* (2013.01); *G01D 13/02* (2013.01)

(58) Field of Classification Search
CPC ........ G01D 11/24; G01D 11/28; G01D 13/02; B60K 2370/152; B60K 2370/154; B60K 2370/332; B60K 2370/343; B60K 35/00
See application file for complete search history.

(56) References Cited

U.S. PATENT DOCUMENTS 4,404,522 A * 9/1983 Pucciarello ............ G01D 11/28
                                                116/300
5,140,259 A * 8/1992 Aida ..................... G01D 11/24
                                                324/156

(Continued)

FOREIGN PATENT DOCUMENTS

JP            S4-79216 U     7/1992
JP         2002-107183 A     4/2002

(Continued)

OTHER PUBLICATIONS

International Search Report issued in corresponding International Application No. PCT/JP2018/028040, dated Oct. 23, 2018, with English translation.

*Primary Examiner* — Nimeshkumar D Patel
*Assistant Examiner* — Tania Courson
(74) *Attorney, Agent, or Firm* — McDermott Will & Emery LLP

(57) ABSTRACT

An instrument includes: a liquid-crystal display device including a display element and light sources provided along one side surface extending in the Y direction of the element; a first case having a reference positioning pin, and other positioning pins; and a second case having a reference hole into which the reference positioning pin is inserted, other holes into which the other positioning pins are inserted, a first region in which a first pointer-type instrument is provided, a second region in which a second pointer-type instrument is provided, and a third region in which the liquid crystal display device is provided between the first region and the second region. The third region has an edge corresponding to the position where the side surface 4a is disposed, and the reference hole is provided on the edge side with respect to the center of the third region in the X direction.

6 Claims, 4 Drawing Sheets

(56) References Cited

U.S. PATENT DOCUMENTS

| | | | | |
|---|---|---|---|---|
| 5,430,612 A * | 7/1995 | Simon | ............... | B60K 37/02 |
| | | | | 361/752 |
| 5,959,844 A * | 9/1999 | Simon | ............. | H05K 1/0271 |
| | | | | 361/679.01 |
| 8,662,689 B2 * | 3/2014 | Takahashi | .......... | B60K 37/02 |
| | | | | 362/23.14 |

FOREIGN PATENT DOCUMENTS

| | | |
|---|---|---|
| JP | 2005-173302 A | 6/2005 |
| JP | 2012-88099 A | 5/2012 |
| JP | 2017-58143 A | 3/2017 |

* cited by examiner

INSTRUMENT PANEL INCLUDING LIQUID CRYSTAL DISPLAY DEVICE

CROSS REFERENCE

This application is the U.S. National Phase under 35 U.S.C. § 371 of International Application No. PCT/JP2018/028040, filed on Jul. 26, 2018, which claims the benefit of Japanese Patent Application No. 2017-145050, filed on Jul. 27, 2017, the entire contents of each are hereby incorporated by reference.

TECHNICAL FIELD

The present invention relates to an instrument mounted on a vehicle or the like.

BACKGROUND ART

Vehicles such as automobiles and motorcycles are equipped with pointer-type instruments such as speedometers and tachometers and with instruments each including a liquid crystal display device that digitally displays necessary information (for example, see Patent Document 1). Since the liquid crystal display device mounted on the instrument is small in size, the liquid crystal display device mainly includes a so-called edge light backlight (see Patent Document 2).

PRIOR ART DOCUMENT

Patent Document

Patent Document 1: Japanese Unexamined Patent Application Publication No. 2012-88099
Patent Document 2: Japanese Unexamined Patent Application Publication No. 2005-173302

SUMMARY OF THE INVENTION

Problems to be Solved by the Invention

When the liquid crystal display device includes the edge light backlight, the light source is placed on either side surface of a liquid crystal display element (display screen). Accordingly, the entire outer shape of the liquid crystal display device is formed such that only either side surface is larger than the liquid crystal display element. Such a liquid crystal display device is placed to be fitted into such as an opening formed in a case. In addition, the case is covered by such as a dial board that includes an opening formed in a shape conforming to the liquid crystal display element. Thus, only the liquid crystal display element is visually recognized by a user.

Here, in a case where the pointer-type instruments are laterally symmetrically designed with respect to the liquid crystal display element, the liquid crystal display element and each of the pointer-type instruments are located as close as possible. Thus, the instrument may be designed with a sense of unity as a whole.

However, in a case where the aforementioned liquid crystal display device including the edge light backlight is structured such that the light source is disposed on one side surface located adjacent to one of the pointer-type instruments, the pointer-type instruments cannot be located uniformly close to the liquid crystal display element. In other words, one of the pointer-type instruments may be located separated from the liquid crystal display element. In addition, it is necessary that the opening of the case is formed so as to have a clearance to the outer shape of the liquid crystal display device in consideration of dimensional errors such as expansion and contraction of resin. Consequently, the clearance may inhibit the liquid crystal display element from being arranged close to the pointer-type instrument.

The present invention is made in view of such circumstances, and an object of the present invention is to provide an instrument that can improve design flexibility.

Solution to Problem

In order to solve the aforementioned problems, an instrument according to an aspect of the present invention includes: a liquid crystal display device including a liquid crystal display element and a light source provided on one side surface extending in a first direction of the liquid crystal display element; a first case including a reference positioning pin as a reference for positioning and other positioning pins; a second case including a reference hole into which the reference positioning pin is inserted, other holes into which the other positioning pins are inserted, a first region in which a first pointer-type instrument is provided, a second region located side by side in a second direction orthogonal to the first region in the first direction, the second region in which a second pointer-type instrument is provided, and a third region located between the first region and the second region, the third region in which the liquid crystal display is provided. The third region includes an edge located correspondingly to a position at which the side surface is placed, and the reference hole is provided closer to the edge than a center of the third region in the second direction.

Effect of the Invention

The instrument according to the present invention can improve design flexibility.

MODE FOR CARRYING OUT THE INVENTION

An instrument according to an embodiment of the present invention will be described with reference to the accompanying drawings. The instrument according to the embodiment of the present invention is mounted, for example, on a vehicle such as an automobile or a motorcycle, a ship, or an agricultural machine. In the present embodiment, an example where the instrument of the present invention is mounted on an automobile will be described.

Figure 1:
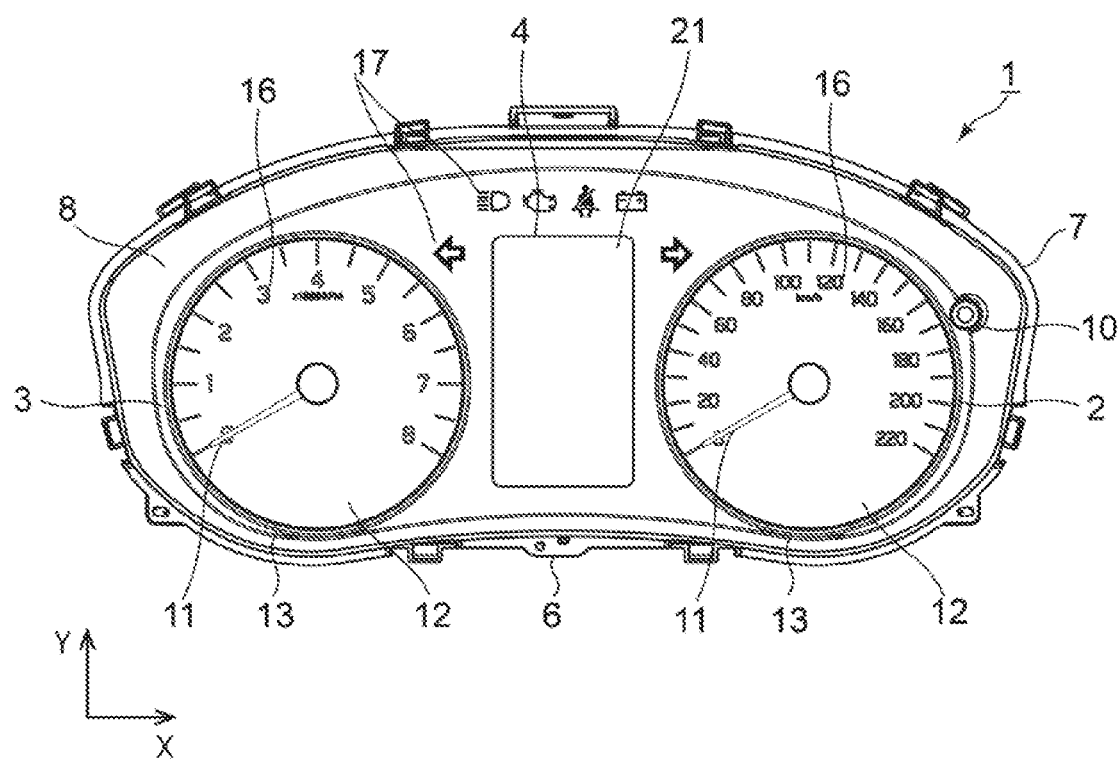
FIG. 1 is a front view illustrating the entire structure of an instrument according an embodiment of the present invention.

FIG. 1 is a front view illustrating the entire structure of an instrument according an embodiment of the present invention.

Figure 2:
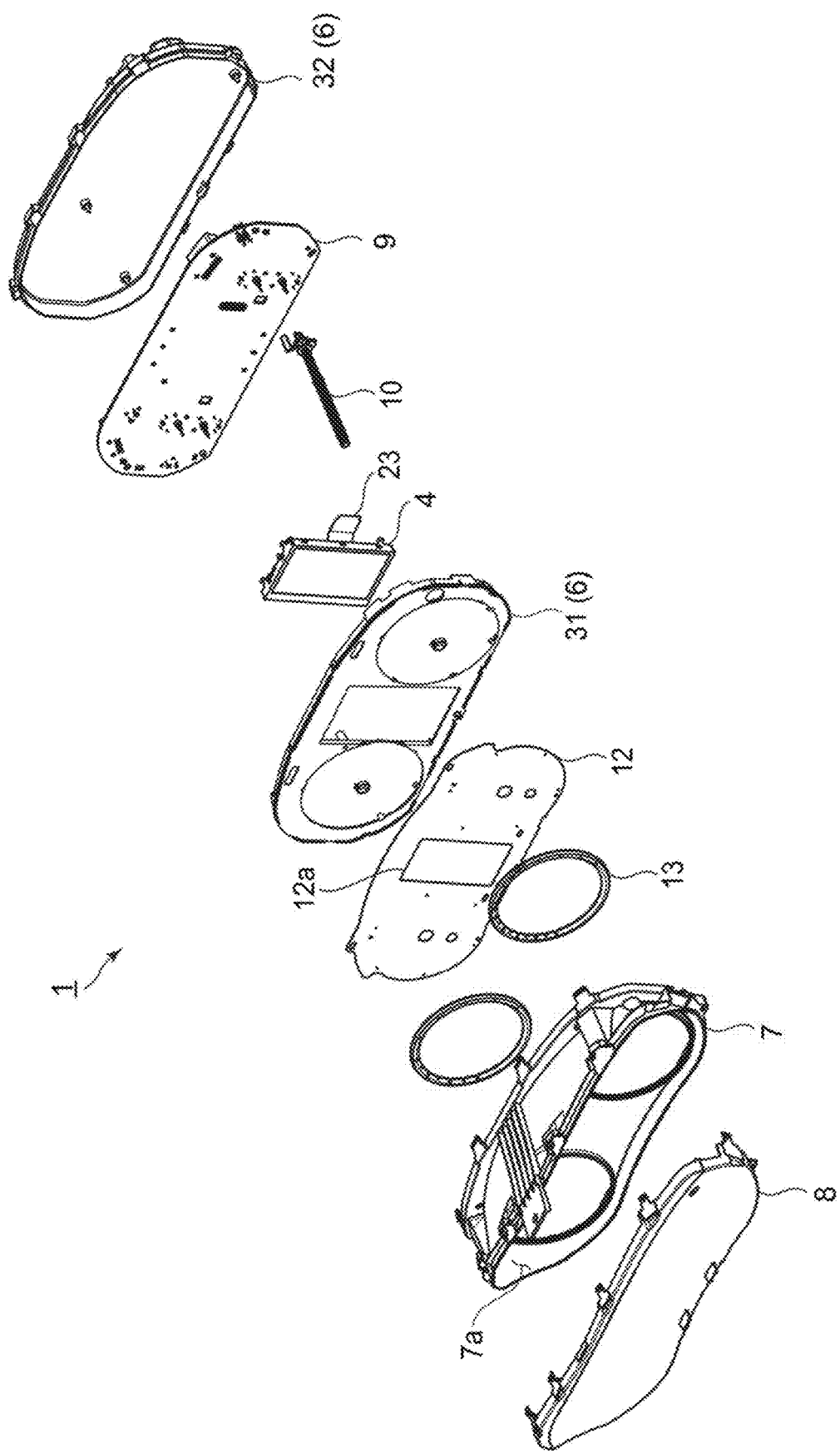
FIG. 2 is an exploded perspective view of the instrument of FIG. 1.

FIG. 2 is an exploded perspective view of the instrument 1 of FIG. 1.

Figure 3:
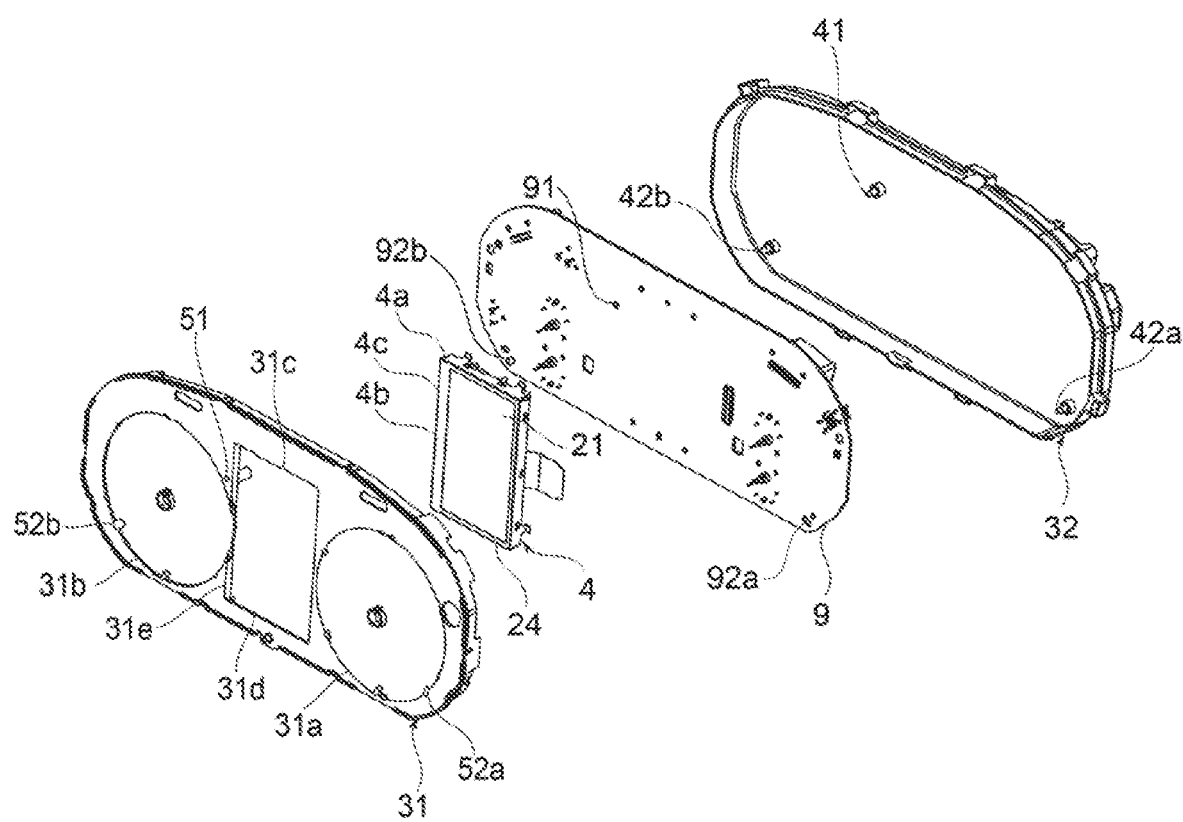
FIG. 3 is an exploded perspective view specifically illustrating an inner case, a liquid crystal display device, a circuit board, and an outer case, in the exploded perspective view of FIG. 2.

FIG. 3 is an exploded perspective view specifically illustrating an inner case 31, a liquid crystal display device 4, a circuit board 9, and an outer case 32, in the exploded perspective view of FIG. 2.

Figure 4:
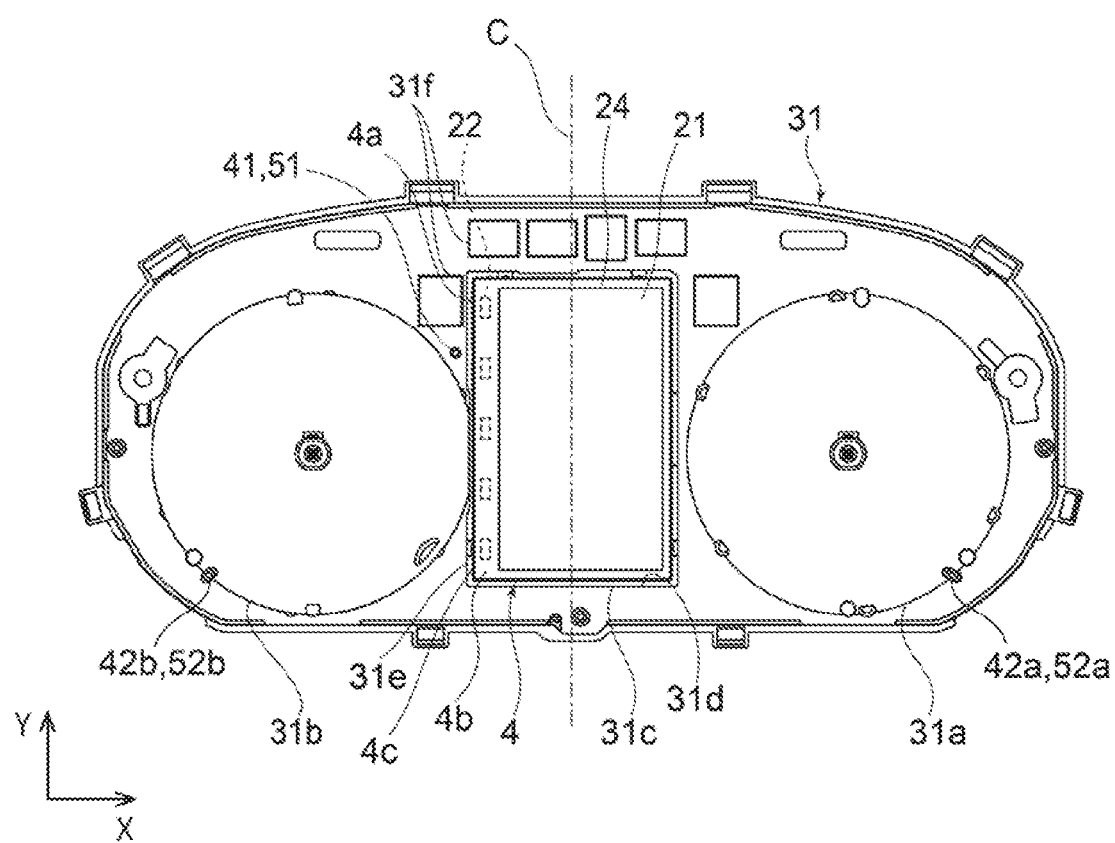
FIG. 4 is a front view illustrating a state where the inner case, the liquid crystal display device, the circuit board, and the outer case are assembled.

FIG. 4 is a front view illustrating a state where the inner case 31, the liquid crystal display device 4, the circuit board 9, and the outer case 32 are assembled.

In the following descriptions, "front side" means the near side in FIG. 1, and "back side" means the far side in FIG. 1.

The instrument 1 includes a speedometer 2, a tachometer 3, and the liquid crystal display device 4. The speedometer 2 is an example of a second pointer-type instrument. The tachometer 3 is an example of a first pointer-type instrument. The speedometer 2 and the tachometer 3 are disposed side by side in the X direction in FIG. 1. The liquid crystal display device 4 is disposed between the speedometer 2 and the tachometer 3.

The speedometer 2 and the tachometer 3 include pointers 11, dial boards 12, and decorative members 13. Each of the pointers 11 (omitted in FIG. 2) rotates about a pointer shaft as a shaft center. Each of the dial boards 12 is, for example, a thin plate and is provided on the back side of the pointers 11. The dial board 12 includes indicator portions 16 indicated by the pointers 11, and warning light display portions 17. The indicator portions 16 are scales, letters, symbols, and the like. The warning light display portions 17 are symbols representing various warning lamps such as direction indicator display lights indicating an operation state of an indicator, an engine warning light indicating an abnormal state of an engine system, and the like. The dial board 12 includes an opening 12a (FIG. 2) from which a liquid crystal display element 21 of the liquid crystal display device 4, i.e., a display screen as a region in which a display image is displayed, is exposed in a state where the inner case 31 is covered by the dial board 12. Each of the decorative members 13 is disposed on the front side of the dial board 12 so as to surround an operation region of each of the pointers 11. The decorative member 13 is synthetic resin having, for example, a ring shape. The surface of the decorative member 13 includes metallic mirror gloss to increase decorativeness. The gloss is applied, for example, by plating such as chrome plating.

The liquid crystal display device 4 (herein, simply referred to as "display device 4") includes the liquid crystal display element 21 (herein, simply referred to as "element 21") and light sources 22 (FIG. 4). The element 21 is, for example, a IFI (ThinFilmTransistor) liquid crystal display panel formed by filling liquid crystal molecules in a clearance between a pair of glass substrates. A plurality of electrode terminals electrically connectable to a flexible printed circuit board 23 are disposed at an end portion of the element 21. The light sources 22 are provided on one side surface 4a of the element 21, which extends in the Y direction (a first direction) in FIGS. 1 and 4. Therefore, the display device 4 includes a wide portion 4b protruding from the element 21. The display device 4 further includes a light guide plate for allowing light of the light sources 22 provided on the side surface 4a to be radiated over the entire surface, a reflective plate provided on the back of the light guide plate, and a diffuser plate provided on the front of the light guide plate. In other words, the display device 4 in the present embodiment includes a so-called edge light backlight. In addition, the display device 4 includes a frame 24 mainly surrounding the front surface of the display device 4.

The instrument 1 further includes a case 6, a visor 7, a cover plate 8, the circuit board 9, and a knob 10.

The case 6 includes the outer case 32 as a first case and the inner case 31 as a second case. The dial board 12, the decorative members 13, the pointers 11, the visor 7, and the cover plate 8 are arranged on the front side of the inner case 31. The display device 4, the circuit board 9, and the outer case 32 are arranged on the back side of the inner case 31.

The inner case 31 includes a speedometer region 31a as a second region in which the speedometer 2 is provided, a tachometer region 31b as a first region in which the tachometer 3 is provided, and a display device region 31c as a third region in which the display device 4 is provided. The speedometer region 31a and the tachometer region 31b are located side by side in the X direction (a second direction orthogonal to the first direction). Further, the display device region 31c is provided between the tachometer region 31b and the speedometer region 31a. In the present embodiment, the boundaries of the speedometer region 31a and the tachometer region 31b are defined by outer rims of recesses substantially coinciding with the outer shapes of the speedometer 2 and the tachometer 3 when the speedometer 2 and the tachometer 3 are formed. Furthermore, the boundary of the display device region 31c is defined by outer rims of an opening 31d to be fitted the display device 4. Furthermore, the display device region 31c includes an edge 31e located correspondingly to a position at which the side surface 4a of the display device 4 is located and extending in the Y direction. The edge 31e is disposed adjacent to the tachometer region 31b. The inner case 31 further includes warning light illumination regions 31f. The warning light illumination regions 31f are cylindrical illumination rooms through which light emitted from light sources provided on the circuit board 9 described below is guided to the warning light display portions 17.

The outer case 32 includes a reference positioning pin 41, which serves as a reference for positioning, and other positioning pins 42a, 42b. Further, the inner case 31 includes a reference hole 51 through which the reference positioning pin 41 is inserted, and other holes 52a, 52b through which the other positioning pins 42a, 42b are inserted. The reference positioning pin 41 and the reference hole 51 are provided in locations, which are references for positioning the outer case 32 and the inner case 31. In other words, the reference positioning pin 41 and the reference hole 51 are provided in locations adapted to most accurately position the outer case 32 and the inner case 31. The other positioning pins 42a, 42b and the other holes 52a, 52b are used to fix, in the X and Y directions, the outer case 32 and the inner case 31 that are positioned (fixed) with the reference positioning pin 41 and the reference hole 51. The reference hole 51 includes a perfect circular shape substantially the same as the positioning pins 41, 42a, 42b. Meanwhile, each of the other holes 52a, 52b includes, in consideration of assembly errors, an elongated circular shape extending toward the reference hole 51.

The reference hole 51 (the reference positioning pin 41) is provided closer to the tachometer region 31b than the edge 31e in the X direction (in the second direction). In FIG. 4, the reference hole 51 is provided in a region surrounded by the tachometer region 31b, the display device region 31c, and the warning light illumination regions 31f. Further, the reference hole 51 is located in a region surrounded by a straight line passing through the edge 31e, a tangent line of the tachometer region 31b, which is orthogonal to the straight line, and an outer circumference of the tachometer region 31b. Furthermore, the reference hole 51 is preferably provided adjacent to a location in the surrounded region in which the distance between the tachometer region 31*b* and the edge 31*e* is shortest. The location provided with the reference hole 51 is a substantially triangular vacant dead space between the circular tachometer region 31*b* and the rectangular display device region 31*c*, and the space cannot be utilized as another component such as the warning light illumination regions 31*f* or the like. Therefore, the reference hole 51 is provided in the location and thereby is located adjacent to the edge 31*e* to be accurately positioned to the edge 31*e* of the display device region 31*c*. In addition, the dead space can be effectively utilized. The other holes 52*a*, 52*b* (the other positioning pins 42*a*, 42*b*) are provided below the reference hole 51 in FIG. 4 and is located so that each of the other holes 52*a*, 52*b* has a long distance from the reference hole 51 and so that the distance between the other holes 52*a*, 52*b* is large.

The visor 7 is adapted to cover a clearance between the periphery of the dial board 12 and the case 6. The cover plate 8 is made of, for example, transparent synthetic resin. The cover plate 8 is adapted to cover openings 7*a* of the visor 7 so that dust and the like do not enter the speedometer 2, the tachometer 3, and the display device 4. The circuit board 9 is a hard board made of, for example, a glass epoxy material. The circuit board 9 is electrically connectable via the flexible printed circuit board 23 to the electrode terminals of the glass substrates of the display device 4. The circuit board 9 includes LED (light sources) adapted to transmit light and illuminate the indicator portions 16 and the warning light designs 17. The circuit board 9 includes a reference hole 91 through which the reference positioning pin 41 is inserted to extend and elongated holes 92*a*, 92*b* through which the other positioning pins 42*a*, 42*b* are inserted to extend. Each of the elongated holes 92*a*, 92*b* is an elongated hole extending toward the reference hole 91. The knob 10 is made of bar-shaped opaque resin. The knob 10 is inserted in insertion holes of the inner case 31, the dial board 12, the visor 7, and the cover plate 8, and the knob 10 is rotatably attached to the circuit board 9 so as to be pressed onto the circuit board 9.

Here, the display device 4 is structured such that the light sources 22 are provided on the side surface 4*a*; therefore, the wide portion 4*b* protruding from the outer rim of the element 21 is formed. Consequently, even when the element 21 (the display device region 31*c*) is located as close as possible to the tachometer 3 (the tachometer region 31*b*) and the speedometer 2 (the speedometer region 31*a*), the tachometer 3 is separated from the element 21 by the wide portion 4*b*. In order to reduce the separated distance as much as possible, a clearance between the opening 31*d* of the display device region 31*c* and the display device 4 needs to be reduced. The instrument 1 in the present embodiment is designed such that the reference positioning pin 41 and the reference hole 51 are appropriately positioned; therefore, the clearance can be reduced. As a result, the tachometer 3 arranged adjacent to the side surface 4*a* can be located close to the element 21 in the same way as the speedometer 2 is located close to the element 21.

In other words, the reference hole 51 (the reference positioning pin 41) is located closer to the tachometer region 31*b* than the edge 31*e* in the X direction. In addition, the reference hole 51 is provided as close as possible to the edge 31*e*. Therefore, the surroundings of the edge 31*e* can be accurately positioned. This means that in the relationship between the display device 4 and the display device region 31*c*, an edge 4*c* located on the side surface 4*a* and the edge 31*e* of the display device region 31*c* are accurately positioned. Consequently, the display device region 31*c* is disposed such that the clearance between the edge 4*c* of the side surface 4*a* and the edge 31*e* of the display device region 31*c* can be reduced.

As just described, the instrument 1 according to the present embodiment is structured such that the element 21 can be arranged close to the speedometer 2 and the tachometer 3, and thus the design flexibility can be improved.

Although several embodiments of the present invention have been described, the embodiments are provided as examples and are not intended to limit the scope of the invention. The new embodiments of the present invention can be implemented in various forms, and various omissions, replacements, and modifications can be made without departing from the spirit of the invention. The embodiments and modifications thereof are included in the scope and spirit of the invention. In addition, the embodiments are included in the invention described in the scope of claims and equivalents thereof.

For example, the position between the speedometer 2 and the tachometer 3 may be reversed from the aforementioned position, and the speedometer 2 and the tachometer 3 may be configured as pointer-type instruments that indicate other measured values.

DESCRIPTION OF REFERENCE NUMERALS

1 Instrument
2 Speedometer
3 Tachometer
4 Liquid crystal display device (display device)
4*a* Side surface
4*b* Wide portion
4*c* Edge
6 Case
7 Visor
7*a* Opening
8 Cover plate
9 Circuit board
91 Reference hole
92*a* Elongated hole
92*b* Elongated hole
10 Knob
11 Pointers
12 Dial board
12*a* Opening
13 Decorative member
16 Indicator portions
17 Warning light display portions
21 Liquid crystal display element (element)
22 Light sources
23 Flexible printed circuit board
24 Frame
31 Inner case
31*a* Speedometer region
31*b* Tachometer region
31*c* Display device region
31*d* Opening
31*e* Edge
31*f* Warning light illumination regions
32 Outer case
41 Reference positioning pin
42*a*, 42*b* Other positioning pins
51 Reference hole
52*a*, 52*b* Other holes

The invention claimed is:
1. An instrument comprising:
a liquid crystal display device including:

a liquid crystal display element;
a light source provided along a first side surface of the liquid crystal display device, the first side surface of the liquid crystal device extending in a first direction;
a first case including:
  a reference positioning pin; and
a second case including:
  a reference hole into which the reference positioning pin is inserted;
  a first region in which a first pointer-type instrument is provided; and
  a second region in which a second pointer-type instrument is provided; and
  a third region in which the liquid crystal display is provided,
wherein the third region is located between the first region and the second region such that the first region, the second region, and the third region are arranged side by side in order of the first region, the third region, and the second region along a second direction orthogonal to the first direction,
wherein the third region includes an edge extending in the first direction, the edge being located correspondingly to the first side surface of the liquid crystal display device when the liquid crystal display device is provided in the third region,
wherein the first region and the second region each has a circular shape,
wherein the second case includes a fourth region enclosed by i) a straight line extending along the edge of the third region, ii) an outer circumference of the first region, and iii) a tangent line that is tangent to the outer circumference of the first region, the tangent line being perpendicular to the straight line,
wherein the reference hole is provided within the fourth region of the second case,
wherein the edge of the third region is provided closer to the first region than the second region, and
wherein a first distance between the reference hole in the fourth region and the edge of the third region in the second direction is shorter than a second distance between a center of the third region and the edge of the third region in the second direction.

2. The instrument according to claim 1, wherein the reference hole is provided closer to the first region than the edge in the second direction.

3. The instrument according to claim 1,
wherein the liquid crystal display device includes a wide portion extending from the first side surface of the liquid crystal display device towards the center of the liquid crystal display device, and
wherein the wide portion extends from the first side surface towards the center of the liquid crystal display device for a distance to cover the light source provided on the first side surface.

4. The instrument according to claim 1,
wherein the second case includes a fifth region for accommodating a warning light,
wherein the fifth region is disposed on the tangent line such that a part of the fifth region is arranged in the fourth region,
wherein the reference hole is provided in an area of the fourth region, the area of the fourth region being surrounded by i) the straight line extending along the edge of the third region, ii) the outer circumference of the first region, and iii) a bottom edge of the fifth region.

5. The instrument according to claim 1,
wherein the first pointer-type instrument provided in the first region is a tachometer, and
wherein the second pointer-type instrument provided in the second region is a speedometer.

6. The instrument according to claim 1,
wherein the first case further includes other positioning pins, and
wherein the second case further includes other holes into which the other positioning pins are inserted.

* * * * *